Patented Oct. 31, 1944

2,361,504

UNITED STATES PATENT OFFICE 2,361,504

COPOLYMERS OF VINYL HALIDES

Winfield Scott, Akron, Ohio, and Raymond B. Seymour, Allentown, Pa., assignors to Wingfoot Corporation, Wilmington, Del., a corporation of Delaware No Drawing. Application January 17, 1940, Serial No. 314,265

4 Claims. (Cl. 260—86)

This invention relates to copolymers of vinyl halides, specifically, of vinyl chloride and vinyl bromide, and to methods of preparing the same.

It is known that a polymerized material may be made from vinyl chloride, the same being known as polyvinyl chloride, but this substance, as obtained by emulsion polymerization, contains but a small proportion of material which is soluble in ethylene dichloride. It has now been found that an inclusion of vinyl bromide with the monomeric vinyl chloride results in copolymers which are readily soluble in ethylene dichloride and in other similar solvents. Furthermore, polymers containing larger amounts of the bromide are more easily soluble in such solvents than those containing smaller amounts of the bromide. While vinyl chloride has been polymerized by itself and likewise vinyl bromide, and each has been copolymerized with various other monomeric substances, no attempt has been made, apparently, to copolymerize these two substances together. Hence, the solubilizing effect of vinyl bromide in these polymerized vinyl halide mixtures has not previously been observed.

The effect may be obtained with various amounts of the vinyl bromide, proportions from 5 to 90% of vinyl bromide having yielded useful materials. Correspondingly, the vinyl chloride may be present from 95 to 10% on the total weight of monomers present. Other monomers or modifying agents may also be included in the resulting products, in which case the ratios of vinyl bromide and vinyl chloride are maintained on a basis of the total vinyl halides present.

A typical preparation of copolymers of vinyl chloride and vinyl bromide is the following, the proportions of the halides being varied as desired. To fifteen c. c. of a 5% solution of an emulsifying agent, such as Aquarex D (the sodium salt of the sulphate mono esters of higher fatty alcohols) is added a buffer mixture, such as McIlvaine buffer, which gives a hydrogen ion concentration of approximately pH7. To this is then added 1.6 grams of carbon tetrachloride, 0.2 gram of sodium perborate and 25 grams of the desired mixture of monomers of vinyl chloride and vinyl bromide. Polymerization is carried out with agitation at a temperature of 35° C. and is complete in from 20 to 90 hours. The polymer is obtained from the latex thus formed by the addition of alcohol or by salting out. The solid is then washed free of buffer and emulsifying agent and dried.

The ratio of monomeric vinyl chloride and vinyl bromide employed in the procedure given above can be varied as mentioned. In the following table are given the results obtained with various proportions, each of the copolymers being soluble in ethylene dichloride:

| Vinyl chloride | Vinyl bromide | Yield, per cent |
|---|---|---|
| 95 | 5 | 92 |
| 90 | 10 | 88 |
| 85 | 15 | 97 |
| 80 | 20 | 95 |
| 70 | 30 | 96 |
| 50 | 50 | 84 |
| 40 | 60 | 84 |
| 25 | 75 | 82 |
| 10 | 90 | 36 |

It was observed that vinyl bromide polymerizes more slowly than vinyl chloride and, also, that mixtures of vinyl chloride and vinyl bromide containing a large amount of the latter polymerize more slowly than when lesser amounts of the bromide are present. A consequence of this is that lower yields in a given time will be obtained as the proportion of vinyl bromide is increased and, therefore, the yield values given above cannot be taken as absolute. That is to say, satisfactory yields of high bromide copolymers may be obtained by merely continuing the polymerization for a longer time.

Of course, it will be understood that the conditions given in the foregoing example may be varied. Other emulsifying agents may be used in place of Aquarex D, such as Gardinol WA, Wetanol, Nekal B X and Sulfatate, since it is only necessary that effective emulsification of the monomers be obtained. Likewise, other temperatures may be employed, a range of 25° to 80° C. being practicable in most instances. Also, the hydrogen ion concentration can be varied, values from pH6 to pH9 being used and even lower pH values if the proper emulsifier is employed. Furthermore, the mixed vinyl halides may be polymerized in the mass, a temperature of 25° to 80° C. being suitable in this procedure also, and a catalyst of the peroxide type, such as benzoyl peroxide, being employed to increase the rate of reaction.

The copolymers obtained were found to be solids in every instance where the polymerization had proceeded far enough and all of the samples were readily soluble in such solvents as ethylene dichloride, chlorbenzene, methyl chloroform, and the like. This property of solubility in these solvents renders the copolymers suitable for making films and for impregnation and lamination of fabrics. They may also be substituted for rubber in a number of its applications and especially where oil resistance is desired.

While there have been described above certain preferred embodiments of the invention it will be understood that the invention is not limited thereto but that numerous modifications may be made therein within the scope of the appended claims, wherein it is intended to cover all features of patentable novelty residing in the invention.

We claim:

1. Polymerized materials comprising copolymerized vinyl chloride and vinyl bromide containing from 5 to 90% by weight of the vinyl bromide polymerized to a degree which would render the vinyl chloride insoluble in ethylene dichloride if polymerized alone.

2. A copolymer of about 10 to 30 percent by weight of vinyl bromide and about 90 to 70 percent by weight of vinyl chloride polymerized to a degree which would render the vinyl chloride insoluble in ethylene dichloride if polymerized alone.

3. An ethylene-dichloride-soluble material comprising copolymerized vinyl chloride and vinyl bromide containing from 5 to 90% by weight of the vinyl bromide polymerized to a degree which would render the vinyl chloride insoluble in ethylene dichloride if polymerized alone.

4. An ethylene-dichloride-soluble material comprising a copolymer of about 30% by weight of vinyl bromide and about 70% by weight of vinyl chloride polymerized together to a degree which would render the vinyl chloride insoluble in ethylene dichloride if polymerized alone.

WINFIELD SCOTT.
RAYMOND B. SEYMOUR.